United States Patent Office.

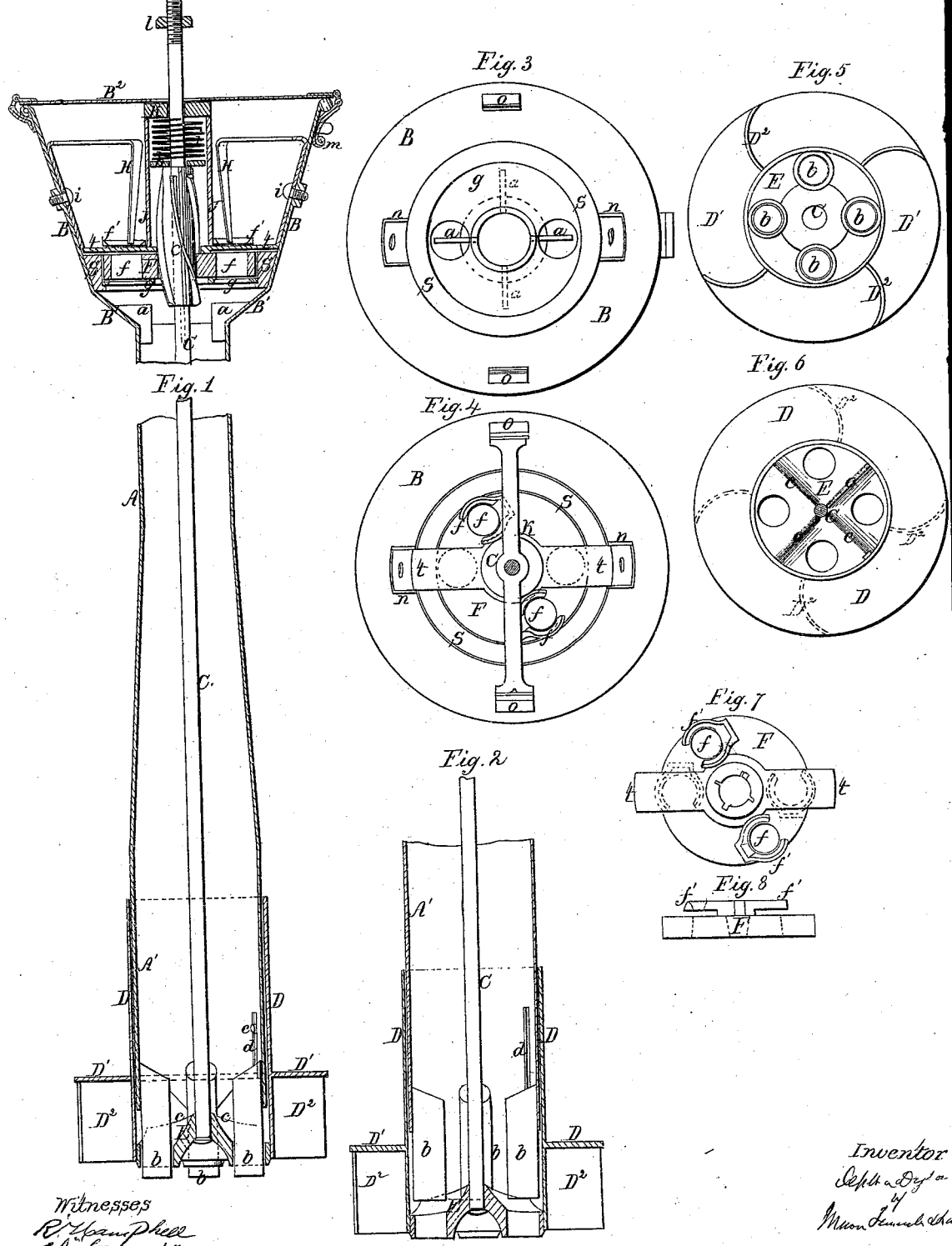

JEPTHA DYSON, OF PHILADELPHIA, PENNSYLVANIA.

*Letters Patent No. 93,690, dated August 17, 1869; antedated August 4, 1869.*

IMPROVEMENT IN HAND SEED-PLANTERS.

The Schedule referred to in these Letters Patent and making part of the same.

*To all whom it may concern:*

Be it known that I, JEPTHA DYSON, of Philadelphia, in the county of Philadelphia, and State of Pennsylvania, have invented certain new and useful Improvements in Hand Seed-Planters; and I do hereby declare that the following is a full, clear, and exact description thereof, reference being had to the accompanying drawings, making a part of this specification, in which—

Figure 1 is a diametrical section through the improved planter, with portion of its hollow stock broken away, representing its several parts as they appear when pressure is applied to force the foot-piece into the earth.

Figure 2 is a diametrical section of the foot-piece and plungers, as they appear when pressure is relieved from the planter and it is lifted from the ground.

Figure 3 is a top view, showing the interior of the hopper, with the seed-dropping devices removed from it.

Figure 4 is a top view, showing the interior of the hopper, with its seed-dropping devices applied.

Figure 5 is a bottom view of the planter.

Figure 6 is a top view of the foot-piece or lower section of the planter.

Figure 7 is a top view of the oscillating distributer and its striking-bridge.

Figure 8 is a side view projected from fig. 7.

Similar letters of reference indicate corresponding parts in the several figures.

This invention relates to certain novel improvements of that class of hand implements which are designed for planting corn, cotton-seed, peas, beans, and other seeds, at determined distances apart, and which are so constructed that in the act of forming the dibble-holes by pressing their lower ends into the soil, any given number of seeds is deposited, and in the act of withdrawing the said ends, the seeds can be covered, if required.

The nature of my invention consists in attaching, in a suitable manner, to the bottom of a pipe or hollow staff, having a seed-hopper and distributing-devices upon its opposite end, a movable flanged sheath or foot-piece, which piece is provided with covering-wings, and also with a perforated bottom through which plungers work that are fast upon the main pipe or stock, as will be hereinafter explained; and, in conjunction with said movable section, its plungers and coverers, The invention also consists in an oscillating seed-distributer, applied in the hopper at the upper end of the pipe or stock, and operated by a spirally-feathered cylinder upon a rod which is fixed to the said movable section, said distributer serving to take from the hopper a given number of seeds at every oscillation, and drop them into the pipe or stock, as will be hereinafter explained.

The invention further consists in a novel construction of the seed-distributing devices, clearers, guards, and stirrers, whereby these parts are caused to work smoothly and without liability to clog and become deranged, and whereby a given number of seeds can be deposited into the soil with great precision at, each operation of the implement, as will be hereinafter explained.

To enable others skilled in the art to understand my invention, I will describe its construction and operation.

In the accompanying drawings—

A represents a hollow stock, which may be made of any suitable diameter and length, and which is preferably made circular in cross-section.

This stock has a flaring hopper, B, formed upon its upper end, and a flaring enlargement formed upon its lower part, which latter terminates in a cylindrical portion, A', of greater diameter than the main body of the stock.

This enlargement receives upon it a sheath, D, having a perforated bottom, E, which sheath and its bottom are free to slide upon the portion A', and are prevented from turning thereon by a stud, $e$, upon D, and a long slot, $d$, in A', as shown in fig. 1.

At a short distance from the bottom of the sheath D, a circular flange, D¹, is applied fast to this sheath, upon which flange a number of curved plates, D², is constructed, which extend down to the plane of the bottom of the sheath, and serve as means for covering with earth the seeds which are dropped from the implement.

These coverers D² are arranged at equal distances apart around the sheath, and in consequence of their curved form they will gather the earth toward the seeds dropped into the soil, by simply giving the implement a turn about its axis after each operation of dropping.

The bottom plate E of the sheath is constructed with four, or more or less holes through it, at equal distances apart around its central rod C, which holes are designed to allow the seeds to drop into the soil, and also to receive through them plungers $b\ b$, which are secured to the inner side of the stock portion A'.

The bottom of this plate E is hollowed out centrally to form a space for receiving earth when the lower end of the implement is pressed down therein, which earth will assist in covering the seeds deposited in the act of lifting the implement.

The upper side of the plate E is constructed with concavities in it, separated by ridges $c$, so that no seeds can find lodgement thereon.

The seed-hopper B is provided with a hinged cover, B², through the centre of which is a hole for allowing the upper end of rod C to play, and the lower end of this hopper terminates in a contraction, B¹, which forms a space between a fixed plate, $g$, and the upper end of the hollow stock A, for the free escape of seeds from this plate, and also for receiving the radial plates $a$, shown in figs. 1 and 3. These wings are equally spaced around the axis of the implement, and form short partitions or divisions for the proper guiding of the seeds in their fall from plate $g$ to the plate E.

At the bottom of the hopper B, and rigidly secured therein, in a plane with its top edge, is a ring, S, having a short annular flange formed upon its inner vertical surface for receiving and supporting the plate $g$.

This plate $g$ is shown in figs. 1 and 3. It has two holes through it, diametrically opposite one another, through which the seeds are dropped by an oscillating distributing-plate, F.

Plate $g$ forms a cut-off for the holes $f$ through plate F, when this latter plate is in the position shown in fig. 4, but when it is in the position shown in fig. 1, the holes $f$ are brought directly over the holes through plate $g$, and seeds will be dropped.

This plate $g$ also has a hole through its centre large enough to allow the spirally-ribbed drum C' to play freely in a vertical direction.

The circular distributing-plate F is fitted within the ring S, and upon the plate $g$, a washer may be interposed, if desirable, so that this plate F is free to turn about its axis without undue friction.

The holes $f f$, through this distributer, are diametrically opposite one another, and serve as seed-cups for receiving seeds from the hopper in proper quantities, and dropping these seeds through the holes made through plate $g$ every time the lower end of the implement is pressed into the soil.

Through the centre of distributer-plate F, a circular hole is made, having oblique grooves radiating from it, as shown in fig. 7. This hole is adapted for receiving through it a spirally-flanged or feathered drum, C', which is fast upon the rod C, as shown in fig. 1, and by the lengthwise movement of which the plate F will be oscillated.

The distributing-plate F is held down in its place by means of a thin spring-bridge, $t$, between which and said plate a washer is interposed.

This bridge $t$ extends diametrically across the top of plate F, and is centrally perforated to allow the flanged drum C' to play freely through it. Its ends rest upon the top of ring S, and may be held down thereon in any suitable manner.

This bridge $t$ is made wide enough to cover the holes $f$, which it does when these holes are brought over the holes through plate $g$, as shown in fig. 1, and also in dotted lines fig. 7; hence, it will be seen that this bridge $t$ also serves as a striker or cut-off for the charges of seed received in the holes $f$.

Rising from the plate $t$ is a barrel, J, which is held down in place by means of a removable bridge, K, the ends of which are tongued and grooved into blocks $o$ $o$, fastened upon the inner side of hopper B, near the upper end thereof.

This barrel J is of such diameter as to receive freely within it the spirally-flanged drum C', when this drum is exposed above the striker $t$, and the bridge $k$ is centrally perforated to receive through it and serve as a guide for the rod C, carrying the said drum C'.

Within the barrel J is a helical spring, $j$, which is enclosed between the said bridge $k$, and a movable plate, $h$, and which is made of sufficient strength to restore the several working-parts of the implement to their normal position upon the removal of pressure after forming each dibble-hole and dropping seeds therein.

The small sliding plate $h$ is perforated, so that it will receive through it the rod C and rest upon the upper end of the flanged drum C', as shown in fig. 1.

The nut $l$, on the upper end of the rod C, serves to keep this rod and its attachments within the body of the implement by bearing against the bridge K, and it also serves as a means for adjusting the throw of the foot-sections and regulating the amount of movement thereof, and also that of the oscillating distributer F.

For the purpose of facilitating and insuring the flow of seed into the holes or cups $f f$, and the complete charging of the same, I partially surround each hole $f$ with a bevelled or upwardly-flaring border, $f'$, which is secured to or formed on the top surface of the plate F at a point in rear of each hole, with its arms extending forward, and being separated from the plate by a space wide enough to receive the striker-bridge $t$, when plate F is moved so as to bring the holes $f$ beneath said bridge $t$.

These bevelled arms or borders $f' f'$ will operate as stirrers and fillers for insuring full charges of seed in the holes or cups $f$.

If desirable, the upper surface of the distributer-plate F may be corrugated, or provided with pins or studs, which will agitate the seed in the hopper B, and prevent their clogging.

In fig. 1, I have shown two light spring-fingers H H, which are thin strips, bent so as to overhang the distributer when secured in place by short bolt and nuts at $i$ $i$.

One end of each piece H is fitted between flanges $n$, so as to be adjustable vertically, and the other end of each piece is arranged directly over the centre of its respective seed-hole or cup $f$, when the latter is in position for being filled.

These spring-fingers break up any lodgement of seeds of foreign substances about the seed-holes.

The operation is as follows:

The seed being put into the hopper B and the cover fastened down at $m$, the operator proceeds to press the lower end of the implement into the soil as far as the flange or guard-plate D¹, if necessary. During this operation, the main body of the implement will descend into the sheath or foot-piece D and cause the plungers $b$ $b$ to pass down through their respective holes through the plate E, and thus prevent earth from getting into said holes. At the same time the pressure is applied, the feathered drum C' will move the distributer F about its axis and bring its holes or cups $f f$ filled with seed over the holes through base-plate $g$ and beneath the striker-bridge $g$. The surplus seeds are thus cut off and the seeds which were in the holes or cups $f f$ are dropped to the bottom of the sheath D. As soon as the operator begins to remove the pressure from the implement, the plungers $b$ are retracted into the sheath and the seeds allowed to drop into the dibble-holes. By giving a brisk turn to the instrument before it is fully raised from the ground, the covering-blades D², under the guard, will cover the seeds with earth. The spring $j$ within the hopper B will press down the rod C and its sheath D when pressure is removed from it, and thereby return the oscillating distributer F to the position it first occupied, when its holes or cups will again fill with seeds ready for another distribution.

Having described my invention,

What I claim as new, and desire to secure by Letters Patent, is—

1. Covering-plates D², applied to the sheath D, beneath a flange or guard-plate D¹, said sheath being constructed with a perforated bottom plate, E, to receive through it the pistons or plungers $b$ on the main body of the implement, substantially as described.

2. Sheath D, applied upon the lower end of a tubular stock, A, and constructed to operate substantially as described, in combination with a rod, C, a spirally-flanged drum, C', and oscillating distributing-plate F, the latter being applied to the bottom of the hopper, substantially as described.

3. Fitting the oscillating plate F within a fixed ring, S, upon a perforated bottom plate, $g$, in combination with a holding-down bridge, $t$, applied within the hopper, substantially as described.

4. The combination of oscillating-distributer F and spirally-flanged drum C' with a spring-bridge, $t$, which latter serves to hold said distributer down in place and also as a cut-off or striker, and pieces H H, applied within the hopper B, and operating substantially as described.

5. The barrel J, interposed between the bridges $t$ and $k$, and containing a spring, $j$, applied so as to operate upon the rod O, substantially as described.

6. Bevelled overhanging fillers $f'$, applied to distributer F, substantially as described.

7. Division-plates $a$, applied in a chamber at the base of the hopper B, in combination with distributing-plate F, substantially as described.

8. The perforated foot-plate E, ribbed on its upper side, and made with a downwardly-flaring cavity in the centre of its bottom side, substantially as described.

JEPTHA DYSON.

Witnesses:
C. M. BANKS,
HENRY B. RIEHLÉ.